United States Patent
Kälvesten (10) Patent No.: US 11,662,787 B2
(45) Date of Patent: May 30, 2023

(54) METHOD AND SYSTEM FOR CONTROLLING DATA STORAGE DEVICE TEMPERATURE

(71) Applicant: Axis AB, Lund (SE)

(72) Inventor: Gustav Kälvesten, Lund (SE)

(73) Assignee: AXIS AB, Lund (SE)

( * ) Notice: Subject to any disclaimer, the term of this patent is extended or adjusted under 35 U.S.C. 154(b) by 56 days.

(21) Appl. No.: 17/501,081

(22) Filed: Oct. 14, 2021

(65) Prior Publication Data

US 2022/0137686 A1   May 5, 2022

(30) Foreign Application Priority Data

Nov. 5, 2020   (EP) .................................... 20205818

(51) Int. Cl.
*G06F 1/20*   (2006.01)

(52) U.S. Cl.
CPC ..................... *G06F 1/206* (2013.01)

(58) Field of Classification Search
CPC .... G06F 1/206; G06F 11/3034; G06F 1/3221; G06F 1/3225; G06F 1/3268; G06F 1/3275; G06F 11/3058; G11C 5/14
See application file for complete search history.

(56) References Cited

U.S. PATENT DOCUMENTS

| | | | |
|---|---|---|---|
| 5,262,758 A | 11/1993 | Nam et al. | |
| 9,418,179 B2 | 8/2016 | Zhang et al. | |
| 9,578,787 B2 | 2/2017 | Desouza et al. | |
| 2004/0035851 A1 | 2/2004 | Antoniou et al. | |
| 2011/0302353 A1 | 12/2011 | Confalonieri et al. | |

(Continued)

OTHER PUBLICATIONS

Chen et al., "A High-Fidelity Temperature Distribution Forecasting System for Data Centers," ACM Transactions on Sensor Networks, 11. 215-224 (2012).

(Continued)

*Primary Examiner* — Chun Cao
(74) *Attorney, Agent, or Firm* — Volpe Koenig (57) ABSTRACT

A method of controlling an operating temperature of a data storage device is disclosed. A threshold temperature for the storage device is set. Over time, during operation of the data storage device, an operating temperature of the storage device is measured at a plurality of points in time. A plurality of temperature measurements as a function of time are thereby obtained. Above threshold temperature measurements are accumulated over time to form a high temperature accumulation value ($V_{high}$), and below threshold temperature measurements are accumulated to form a low temperature accumulation value ($V_{low}$). The low temperature accumulation value ($V_{low}$) and the high temperature accumulation value ($V_{high}$) are compared. If an outcome of the comparison is that the high temperature accumulation value ($V_{high}$) is too high in relation to the low temperature accumulation value ($V_{low}$), an operating temperature lowering action is initiated.

15 Claims, 6 Drawing Sheets

(56) References Cited

U.S. PATENT DOCUMENTS

| | | | |
|---|---|---|---|
| 2012/0016533 A1* | 1/2012 | Lim | G06F 1/206 |
| | | | 713/324 |
| 2012/0029839 A1 | 2/2012 | Ritter et al. | |
| 2012/0033519 A1 | 2/2012 | Confalonieri et al. | |
| 2012/0123610 A1 | 5/2012 | Tupa et al. | |
| 2013/0054179 A1 | 2/2013 | Shapira et al. | |
| 2013/0228632 A1 | 9/2013 | Kapoor et al. | |
| 2014/0365793 A1 | 12/2014 | Cox et al. | |
| 2016/0320995 A1* | 11/2016 | Warriner | G06F 1/206 |
| 2017/0071056 A1* | 3/2017 | Stoev | G11C 7/04 |
| 2018/0164841 A1 | 6/2018 | Lovicott et al. | |
| 2018/0293009 A1* | 10/2018 | Sharon | G06F 11/1068 |
| 2019/0050166 A1 | 2/2019 | Liu | |
| 2020/0050246 A1* | 2/2020 | Karalnik | G06F 1/3296 |
| 2020/0073577 A1* | 3/2020 | Cadloni | G06F 3/0653 |
| 2021/0278887 A1* | 9/2021 | Lee | G06F 1/206 |

OTHER PUBLICATIONS

Extended European Search Report dated May 17, 2021 for European Patent Application No. 20205818.6.

\* cited by examiner

METHOD AND SYSTEM FOR CONTROLLING DATA STORAGE DEVICE TEMPERATURE

FIELD OF INVENTION

The present invention relates to control of temperature in data storage devices. In particular, it relates to balancing performance and cooling requirements in data storage devices, such as hard disk drives.

TECHNICAL BACKGROUND

Data storage devices, such as hard disk drives, usually have limits to the temperatures they can endure, outside operation as well as during operation. When a storage device is not in operation and is simply being stored, the allowable temperature range is generally larger than during operation and the actual temperature of the storage device is essentially governed by ambient temperature.

The allowable operating temperature range of a hard disk drive may often be 0-60° C., or 0-70° C. Solid state drives have similar allowable operating temperature ranges. In addition to ambient temperature, the actual temperature of a storage device during operation is also governed by workload on the storage device and by cooling activities, such as fan operation. The limits of the operating temperature range are generally set such that reliable operation can be maintained during a desired or expected lifetime of the storage device. The reliability or durability of a storage device may be determined in terms of MTBF, i.e., mean time between failures. Thus, the minimum and maximum operating temperature may be set such that a long enough MTBF is ensured. During operation, the minimum operating temperature will in practice not be limiting, as the storage device produces heat as soon as it is started. The maximum operating temperature will be of greater importance. In order to keep the storage device below the maximum operating temperature, cooling arrangements such as fans may be used for lowering the operating temperature of the storage device. Reducing the workload on the storage device is also a way of allowing the operating temperature to go down, provided that the ambient temperature is well below the maximum operating temperature.

Keeping a data storage device below the maximum operating temperature may require significant cooling action, which may in turn require powerful fans, adding to the cost of the storage system and consuming high amounts of electric power. Furthermore, fans get worn and produce noise. Regulating the operating temperature of a storage device may also lead to lower than desired performance, if the workload on the storage device needs to be reduced. This may in turn lead to a need for more storage devices for being able to ensure a required available capacity at all times, thereby increasing the cost of storage and taking up more space.

Designing data storage devices that can withstand higher operating temperatures is a possibility but comes at an additional cost, just like cooling arrangements and redundant storage device capacity.

A need remains for effective ways of controlling the operating temperature of a data storage device.

SUMMARY

Providing an efficient method of controlling the operating temperature of a data storage device would be beneficial. Additionally, providing a temperature control method which makes it possible to provide a better balance between cooling needs and storage device performance, and that enables better use of a storage device would also be beneficial.

Providing a temperature controller for controlling the operating temperature of a storage device, makes it possible to more efficiently control the operating temperature of the storage device. Providing a temperature controller allows a storage device to be operated safely for a long time, while balancing the needs for cooling and storage performance.

According to a first aspect, a method of controlling an operating temperature of a data storage device comprises the steps of setting a threshold temperature for the storage device; over time, during operation of the data storage device, measuring an operating temperature of the storage device at a plurality of points in time, thereby obtaining a plurality of temperature measurements as a function of time; accumulating above threshold temperature measurements over time to form a high temperature accumulation value; accumulating below threshold temperature measurements over time to form a low temperature accumulation value; comparing the low temperature accumulation value and the high temperature accumulation value, and if an outcome of the comparison is that the high temperature accumulation value is too high in relation to the low temperature accumulation value, initiating an operating temperature lowering action. Such a method makes it possible to control the operating temperature of the storage device in a way that can ensure a desired lifetime of the storage device, while also making efficient use of storage capacity as well as cooling. By comparing periods of operating temperature above the temperature threshold with periods of operating temperature below the threshold, it is possible to ensure safe operation of the data storage device without necessarily being restricted to always operating below the maximum allowable operating temperature stated by the manufacturer. In this way, the storage device may be put to better use.

In this context, "too high" means that a ratio between the high temperature accumulation value and the low temperature accumulation value exceeds a reference ratio or that a difference between the high temperature accumulation value and the low temperature accumulation exceeds a predetermined threshold counter value.

In the following, the data storage device may sometimes be referred to simply as a storage device.

The operating temperature lowering action may be at least one from the group of starting a cooling arrangement, increasing performance of the cooling arrangement, or reducing performance of the data storage device.

In a variant, the method further comprises if the outcome of the comparison is that the low temperature accumulation value is sufficiently large in relation to the high temperature accumulation value, increasing performance of the data storage device. In this manner, when it is safe to do so, increased performance may be obtained from the data storage device.

In some variants of the method, the high temperature accumulation value is formed by calculating a first integral of temperature measurements above the threshold temperature as a function of time, the low temperature accumulation value is formed by calculating a second integral of temperature measurements below the threshold temperature as a function of time, and comparing the low temperature accumulation value and the high temperature accumulation value is done by calculating a ratio between the low temperature accumulation value and the high temperature accumulation value. This is a practical way of comparing periods of operating temperature above the threshold temperature with periods of operating temperature below the threshold temperature, such that it can be ensured that the heat load on the storage device is not too high.

The steps of accumulating and comparing may comprise starting a timer. If, at a first point in time, the measured temperature is above the threshold temperature, the method may comprise incrementing a counter in proportion to a number of degrees that the measured temperature is above the threshold temperature. If, at the first point in time, the measured temperature is instead below the threshold temperature, the method may comprise decrementing the counter in proportion to a number of degrees that the measured temperature is below the threshold temperature. The outcome of the comparison may then be that the high temperature accumulation value is too high in relation to the low temperature accumulation value if the counter exceeds a predetermined threshold counter value.

The method may further comprise comparing the measured operating temperature to a maximum allowed temperature, the maximum allowed temperature being higher than the threshold temperature, and if the measured operating temperature is above the maximum allowed temperature, initiating an operating temperature lowering action. Thus, the operating temperature of the storage device may be regulated not only based on the long-term heat load, but also based on a more immediate heat load in order to make sure that reliable operation can be maintained.

In some variants, the method further comprises measuring a first time interval from a first point in time when the measured operating temperature passed from above the threshold temperature to below the threshold temperature to a second point in time when the measured operating temperature next passed from below the threshold temperature to above the threshold temperature, comparing the first time interval with a predetermined minimum time interval, and if the first time interval is shorter than the predetermined minimum time interval, issuing an indication that further operating temperature lowering actions may be needed. Even though operating temperature lowering actions, such as cooling or reduced workload succeed to lower the operating temperature below the threshold temperature, the temperature lowering actions taken may be insufficient for keeping the operating temperature below the threshold temperature for any length of time. It may be more efficient to reduce the operating temperature more, such that operating temperature actions can be applied more seldom. For instance, running a fan constantly for five minutes may be less irritating to a user than running the fan for one minute several times at short intervals. Furthermore, quick returns to above threshold temperatures may put more strain on the data storage device, such that MTBF goes down.

The method may further comprise monitoring errors in operation of the storage device, and based on an occurrence of errors, adjusting at least one of the threshold temperature or the operating temperature lowering actions. Such an approach may be useful during design of the data storage device or of a temperature controller for controlling the operating temperature of the data storage device. For instance, the manufacturer may adapt the threshold temperature with which the storage device is marked. Making adjustments based on error monitoring could also be done during operation of the data storage device, such that the temperature control is adapted to better ensure safe operation of the storage device. The longer the storage device has been in operation, the more sensitive it may get to elevated temperature. By monitoring the occurrence of errors, it is possible to adjust the threshold temperature downwards as needed when the storage device grows older.

According to a second aspect, the abovementioned objects are achieved, in full or at least in part, by means of a temperature controller for controlling an operating temperature of a data storage device, the temperature controller comprising a temperature sensor, the temperature controller further comprising circuitry configured to execute a threshold temperature setting function for setting a threshold temperature for the storage device; a temperature measurement function for measuring over time, using the temperature sensor, an operating temperature of the storage device at a plurality of points in time during operation of the storage device, thereby obtaining a plurality of temperature measurements as a function of time; a high temperature accumulation function for accumulating above threshold temperature measurements over time to form a high temperature accumulation value; a low temperature accumulation function for accumulating below threshold temperature measurements over time to form a low temperature accumulation value; a comparing function for comparing the low temperature accumulation value and the high temperature accumulation value; and an operating temperature lowering function for initiating an operating temperature lowering action if an outcome of the comparison is that the high temperature accumulation value is too high in relation to the low temperature accumulation value. With such a temperature controller it may be possible to control the operating temperature of the storage device in such a way that safe operation may be ensured during a desired lifetime of the storage device. The temperature controller makes it possible to control the operating temperature more flexibly, such that the operating temperature may at times be allowed to go above the threshold temperature as long as the operating temperature has not been above the threshold temperature for too long or too high historically. Thus, the lifetime heat load on the storage device is taken into account and not just the instantaneous operating temperature. This may make it possible to use fans and other cooling arrangements more efficiently and it may make it possible to get better performance from the data storage device.

The temperature controller may further comprise circuitry configured to execute a performance increasing function for increasing performance of the storage device if an outcome of the comparison is that the low temperature accumulation value is sufficiently high in relation to the high temperature accumulation value. Thus, the temperature controller makes it possible not only to ensure that the heat load on the storage device is not too high, but also that performance of the storage device is not unnecessarily low.

The high temperature accumulation function may be configured to form the high temperature accumulation value by calculating a first integral of temperature measurements above the threshold temperature as a function of time, and the low temperature accumulation function may be configured to form the low temperature accumulation value by calculating a second integral of temperature measurements below the threshold temperature as a function of time. In such embodiments, the comparing function is configured to compare the low temperature accumulation value and the high temperature accumulation value by calculating a ratio between the low temperature accumulation value and the high temperature accumulation value. Calculating integrals and the ratio between those integrals is a mathematically straightforward way of determining if the high temperature accumulation value is too high in relation to the low temperature accumulation value.

In some embodiments, the temperature controller further comprises circuitry configured to execute a first timer function, and a counter function. In such embodiments, the high temperature accumulation function is configured to increment the counter in proportion to a number of degrees that the measured temperature is above the threshold temperature if, at a first point in time, the measured temperature is above the threshold temperature, the low temperature accumulation function is configured to decrement the counter in proportion to a number of degrees that the measured temperature is below the threshold temperature if, at the first point in time, the measured temperature is below the threshold temperature, and the comparing function is configured to determine that the high temperature accumulation value is too high in relation to the low temperature accumulation value if the counter exceeds a predetermined threshold counter value. This provides a simple, yet reliable way of monitoring the behaviour of the high temperature accumulation value in relation to the low temperature accumulation value.

The temperature controller may further comprise circuitry configured to execute a temperature comparing function for comparing the measured temperature to a maximum allowed temperature, and the operating temperature lowering function may further be configured to initiate an operating temperature lowering action if the measured temperature is above the maximum allowed temperature. The maximum allowed temperature is higher than the threshold temperature. Hereby, the temperature may be controlled not only based on the long-term heat load, but also on a higher temperature above which the storage device should not be operated.

In some embodiments, the temperature controller further comprises circuitry configured to execute a second timer function for measuring a first time interval from a first point in time when the measured temperature passed from above the threshold temperature to below the threshold temperature to a second point in time when the measured temperature next passed from below the threshold temperature to above the threshold temperature, a time comparing function for comparing the first time interval with a predetermined minimum time interval, and an indicator function for issuing an indication that further operating temperature lowering actions may be needed if the first time interval is shorter than the predetermined minimum time interval. The storage device may be more quickly worn if the operating temperature is often above the threshold temperature, even though the total heat load historically has been acceptable as determined by a comparison of the high temperature accumulation value and the low temperature accumulation value. Additionally, cooling resources, such as fans, may be more efficiently used if the operating temperature is kept below the threshold temperature for longer periods at a time.

The temperature controller may further comprise circuitry configured to execute an error monitoring function for monitoring errors in operation of the storage device, and an adjustment function for adjusting at least one of the threshold temperature and the operating temperature lowering actions based on an occurrence of errors. If errors occur more frequently than acceptable, the threshold temperature may need to be set lower or the operating temperature lowering actions may need to be more powerful. This may be useful during design of the storage device or of the temperature controller. This may also be useful during operation of the storage device, allowing adaptation of the temperature control if necessary.

According to a third aspect, the abovementioned objects are achieved, in full or at least in part, by means of a data storage device comprising a temperature controller according to the second aspect. The data storage device may generally be embodied in the same ways as the temperature controller of the second aspect, with accompanying advantages.

According to a fourth aspect a non-transitory computer readable storage medium has stored thereon instructions for implementing the method according to the first aspect, when executed on a device having processing capabilities. The storage medium may generally be varied in the same ways as the method of the first aspect.

A further scope of applicability will become apparent from the detailed description given below. However, it should be understood that the detailed description and specific examples, while indicating preferred embodiments, are given by way of illustration only, since various changes and modifications within the scope of the teachings will become apparent to those skilled in the art from this detailed description.

Hence, it is to be understood that the embodiments are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

DETAILED DESCRIPTION

Figure 1:
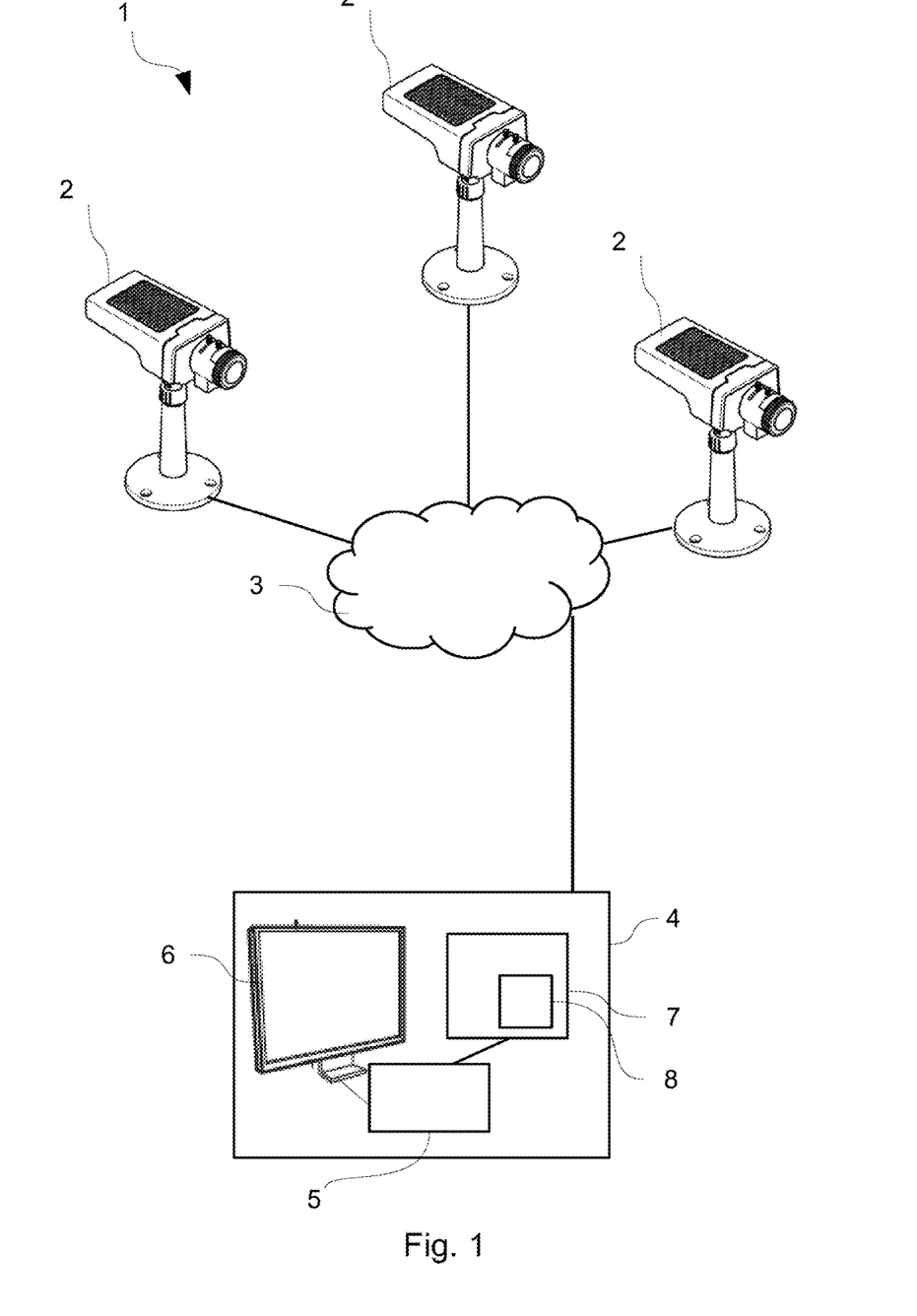
FIG. 1 is a diagram of a system including a data storage device.

In FIG. 1, a video surveillance system 1 is shown. The invention will be discussed in the context of such a video surveillance system. However, it should be appreciated that the embodiments are not in any way limited to video surveillance but are applicable to data storage devices in general, be they connected to a network or not.

The video surveillance system 1 includes a plurality of network cameras 2 connected to a network 3. The network 3 may be any kind of network, wired or wireless, such as a local area network, a wide area network, or a cellular network. Video captured by the cameras 2 may be stored locally in the cameras 2. More importantly, captured video may be transmitted by the cameras 2, via the network 3, to a remote site, such as a control centre 4. In the control centre 4, there is equipment for viewing and storing received video. There may be a computer 5 running a video management system which provides an operator with the opportunity to view the received video on a display 6. The video may be viewed live, when it is received. Alternatively, or additionally, the received video may be stored in a recorder 7.

Video may need to be retrieved at a later point in time for viewing or analysis, for instance if a crime is reported to have been committed in the area where the cameras 2 are located. At such point, it is important that the cameras have captured video of the relevant scene at the relevant time and that the captured video has been safely transmitted to the control centre 4. These parts of the creation of the video are however not of particular relevance for the present invention and will therefore not be discussed further.

Of greater importance in this context is the storage of the video. The recorder 7 comprises one or more storage devices 8. In this example, the storage devices are hard disk drives. In order to be able to ensure that the relevant video is available when needed, reliable operation of the storage device 8 has to be ensured. Video data that is received from the cameras 2 need to be written safely on the hard disk drives 8. Furthermore, once written, the video data have to be safely stored and retrievable when needed.

With time, hard disk drives are worn by use. One factor that influences the service life of hard disk drives and other data storage devices is temperature. Elevated temperatures tend to reduce MTBF. Therefore, manufacturers set limits to the temperatures at which the hard disk drives can be stored and operated. As noted above, during operation, it is essentially only the upper limit of the allowable operating temperature range that is an issue.

To protect the hard disk drive from overheating, the operating temperature is monitored and if the operating temperature passes above the maximum allowable operating temperature, action is taken to lower the temperature. Such operating temperature lowering action may be to turn on a cooling fan or other cooling arrangement or to increase the power of such a cooling arrangement. Other possible operating temperature lowering actions include reducing the performance of the hard disk drive 8 or even turning it off. If there are more than one hard disk drive 8 in the recorder 7, the hard disk drives may take turns at storing incoming video data, thereby allowing one hard disk drive to cool down while data are being written to the other.

Overzealous operating temperature control leads to unnecessarily high costs of cooling arrangements and high power consumption for cooling. It also leads to lower data storage device performance and higher costs for redundant storage devices. Rather than strictly keeping the hard disk drive below the maximum allowable operating temperature or threshold temperature stated by the manufacturer, the inventor has found that the operating temperature may be allowed to surpass that threshold temperature temporarily, as long as the temperature load above the threshold temperature is not too high compared to periods of operation below the threshold temperature. In other words, operation above the threshold temperature for a limited period of time is acceptable provided the storage device gets sufficient periods of time to recuperate. Thus, the historical heat load on the data storage device should be monitored and operation above the threshold temperature should be balanced by operation below the threshold temperature by means of operating temperature lowering action.

Temperature control of the storage device 8 will now be discussed initially with reference to FIG. 2A, which shows an example of how the operating temperature of the storage device 8 may vary without temperature control.

In periods of high ambient temperature, the operating temperature $T_{op}$ increases and in periods of low ambient temperature, the operating temperature $T_{op}$ decreases. Furthermore, the operating temperature $T_{op}$ increases in periods of high workload on the storage device, such as when large amounts of video data are written to the hard disk drive 8 and when large amounts of video data are read from the hard disk drive 8. If no temperature control is applied, unfortunate combinations of high ambient temperature and high workload may lead to operating temperatures that are detrimental to the hard disk drive 8. As a consequence, the expected service life of the hard disk drive may be shortened, leading to data loss and costs for repairs or replacement of the hard disk drive 8.

As already noted, some form of temperature control is usually applied in order to protect storage devices such as the hard disk drive 8. In FIG. 2B, another example of operating temperature variation of the hard disk drive 8 are shown. Additionally, an upper limit $T_{limit}$ of the operating temperature range stated by the manufacturer is illustrated by a dashed horizontal line. In this example, the operating temperature $T_{op}$ of the hard disk drive 8 is monitored and any time it reaches the upper limit $T_{limit}$, operating temperature lowering action is taken. Thus, a fan or other cooling arrangement may be started, or cooling power may be increased. Alternatively, or additionally, the workload on the hard disk drive 8 may be reduced. In this manner, the operating temperature decreases. When the operating temperature $T_{op}$ has been lowered by a predetermined amount, the operating temperature lowering action ceases.

Figure 2A:
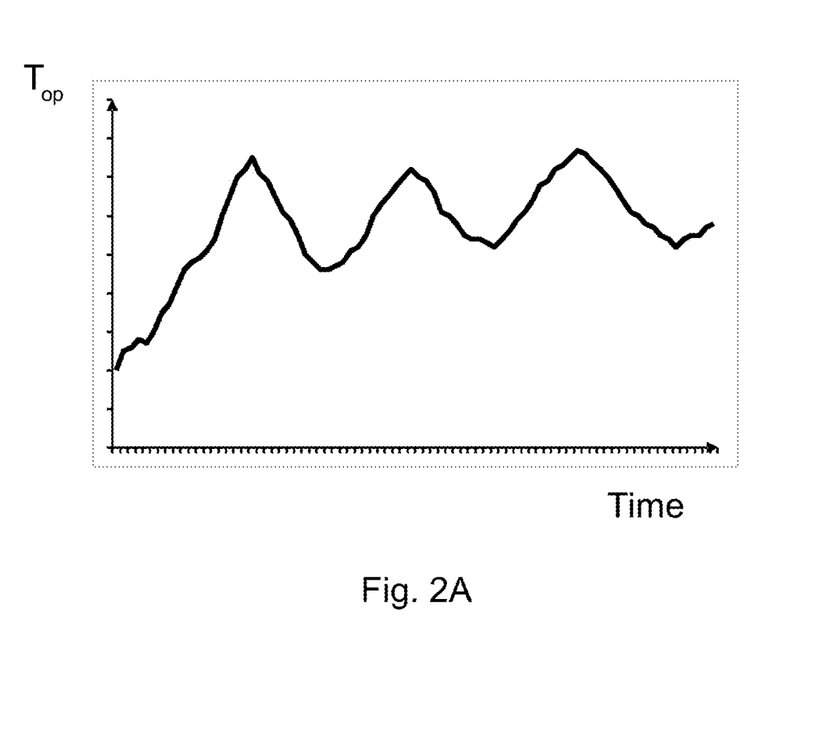
FIG. 2A is a graph showing variations in operating temperature in the data storage device in FIG. 1.
Figure 2B:
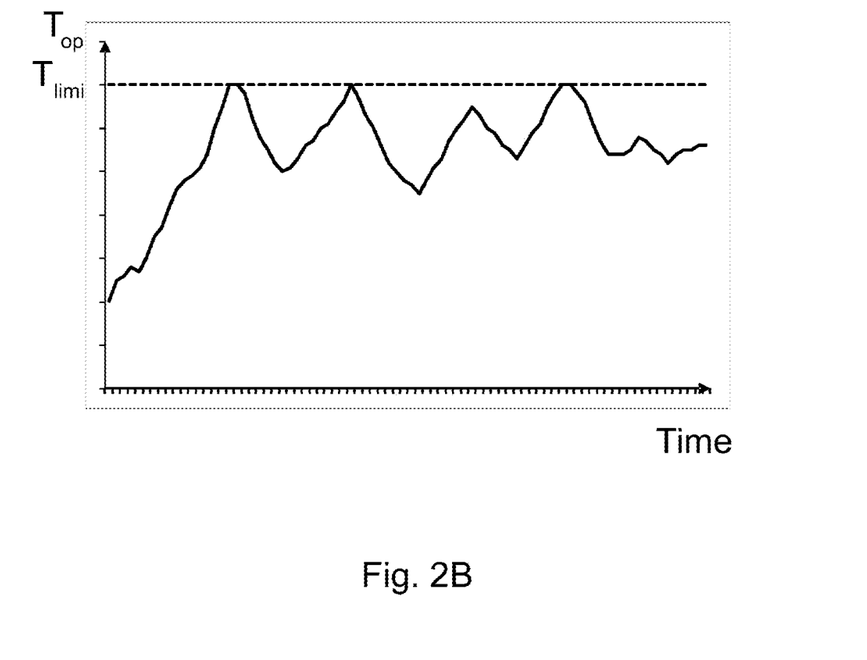
FIG. 2B is a graph showing variations in operating temperature if a prior art method were used for controlling the operating temperature in the data storage device in FIG. 1.

As may be seen from the unregulated example in FIG. 2A, the operating temperature increases and decreases depending on ambient temperature and workload. It should be appreciated that the operating temperature does at times pass back below the upper limit $T_{limit}$ after having exceeded it, even without application of operating temperature lowering action, simply by workload going down by itself and by naturally occurring lowering of the ambient temperature. This may be used to advantage, reducing the need for active cooling and forced lowering of data storage device performance. The hard disk drive 8 may be allowed to operate at elevated operating temperatures for limited periods of time as long as the heat load above the upper limit is balanced historically by operation below the upper limit of the operating temperature range.

Figure 2C:
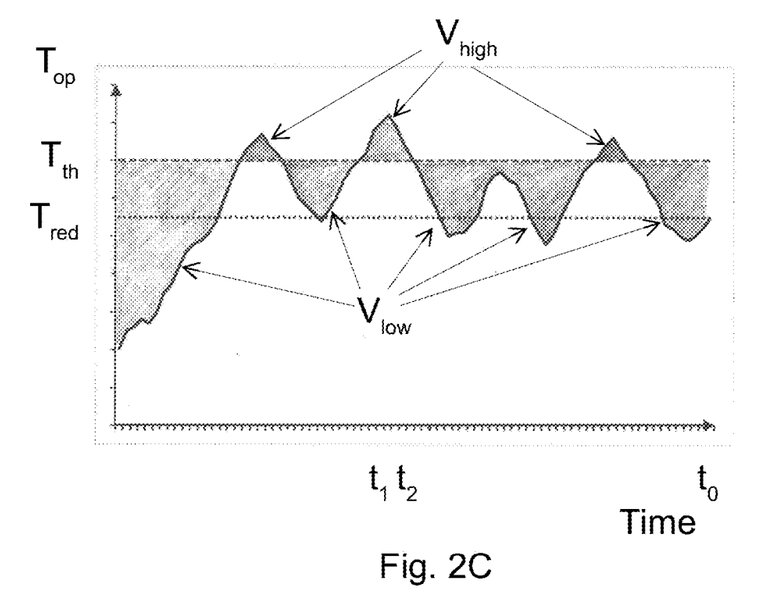
FIG. 2C is a graph illustrating the high temperature accumulation value and the low temperature accumulation value.

With reference to FIG. 2C, this balancing of the heat load will now be described. Once more, an example of operating temperature variations is shown. A horizontal line marks the threshold temperature $T_{th}$ that is used in the operating temperature control scheme. This threshold temperature may or may not be the same as the upper limit $T_{limit}$ of the operating temperature range stated by the hard disk manufacturer. Shaded areas below the threshold temperature $T_{th}$ are marked $V_{low}$, signifying the temperature load below the threshold temperature $T_{th}$, whereas shaded areas above the threshold temperature are marked $V_{high}$, signifying the temperature load above the threshold temperature $T_{th}$. The temperature load below the threshold temperature $T_{th}$ may be represented by a low temperature accumulation value $V_{low}$ and the temperature load above the threshold temperature $T_{th}$ may be represented by a high temperature accumulation value $V_{high}$. The low temperature accumulation value $V_{low}$ and the high temperature accumulation value $V_{high}$ may be determined in one of a few different ways, as will be discussed further below. No matter how they are determined or calculated, they do in one way or another represent the load or stress posed on the hard disk drive 8 by the operating temperature. The low temperature accumulation value $V_{low}$ and the high temperature accumulation value $V_{high}$ each reflect for how long and by how much the operating temperature $T_{op}$ has been below or above the threshold temperature $T_{th}$, respectively.

The operating temperature $T_{op}$ is monitored during operation and at a current time to, the possible need for operating temperature lowering action is determined based on a comparison of the low temperature accumulation $V_{low}$ and the high temperature accumulation value $V_{high}$. If the high temperature accumulation $V_{high}$ is sufficiently small compared to the low temperature accumulation value $V_{low}$, it is determined that there is no need to take any operating temperature lowering action. If, on the other hand, it is found that the high temperature accumulation value $V_{high}$ is too high compared to the low temperature accumulation value $V_{low}$, an operating temperature lowering action is initiated. Thus, a fan may be started, or the speed of the fan may be increased if it is already running. If the hard disk drive is equipped with another cooling arrangement, such as a Peltier element, that may similarly be started or the performance of such a cooling arrangement may be increased. Another possible way of lowering the operating temperature of the hard disk drive 8 is to lower the workload on it. Thus, writing to the hard disk drive 8 may temporarily be stopped and data instead buffered in RAM or written to another hard disk drive. Similarly, reading of data from the hard disk drive 8 may be interrupted. Once the operating temperature Top has been lowered to a predetermined reduced temperature $T_{red}$, the operating temperature lowering action ceases.

The low temperature accumulation value $V_{low}$ and the high temperature accumulation value $V_{high}$ may be calculated as the integral of the measured operating temperature $T_{op}$ over time. The low temperature accumulation value $V_{low}$ is calculated as the integral of the operating temperature as a function of time when the operating temperature is below the threshold temperature $T_{th}$. This may be expressed as:

$$V_{low} = \int_{t=0}^{t=t_0} T_{op}(t), T_{op} < T_{th}$$

The high temperature accumulation value $T_{high}$ is calculated as the integral of the operating temperature as a function of time when the operating temperature $T_{op}$ is above (or equal to) the threshold temperature $T_{th}$. This may be expressed as:

$$V_{high} = \int_{t=0}^{t=t_0} T_{op}(t), T_{op} \geq T_{th}$$

A ratio R between the high temperature accumulation value $T_{high}$ and the low temperature accumulation value $T_{low}$ is then calculated:

$$R = \frac{V_{high}}{V_{low}}$$

The ratio R is compared to a reference ratio $R_{ref}$ and if the calculated ratio R is above the reference ratio $R_{ref}$, the high temperature accumulation value $V_{high}$ is too high compared to the low temperature accumulation value $V_{low}$. In other words, the temperature load on the hard disk drive 8 has up until the current time to been too high, meaning that the operating temperature $T_{op}$ needs to be reduced by one or more of the available operating temperature lowering actions. Conversely, if the calculated ratio R is below the reference ratio $R_{ref}$, the temperature load on the hard disk drive 8 up until the current time is acceptable and there is no need to reduce the operating temperature $T_{op}$.

The low temperature accumulation value $V_{low}$ and the high temperature accumulation value $V_{high}$ need not be determined by calculation of integrals in the strictest mathematical sense. Similarly, the comparison thereof need not be done as the calculation of a ratio, strictly speaking. In a practical implementation, the determination of the low and high temperature accumulation values $V_{low}$, $V_{high}$ and the comparison thereof may be done as will be described in the following with reference to FIGS. 2C and 4. A timer 21 in a temperature controller 30 is started, preferably at the time the hard disk drive 8 is put in operation. At predetermined time intervals, such as once a minute or once every five minutes, the operating temperature $T_{op}$ of the hard disk drive 8 is measured. A counter 22 is used for keeping track of the temperature load on the hard disk drive 8. Depending on whether the measured temperature $T_{op}$ is below or above the threshold temperature $T_{th}$, the counter 22 is decremented or incremented. Thus, if at a first point in time $t_1$, the measured operating temperature $T_{op}$ is above the threshold temperature $T_{th}$, the counter is increased by one. Then, if at the next measurement, at a second point in time $t_2$, the temperature is still above the threshold temperature $T_{th}$, the counter 22 is increased by one again. If, on the other hand, the temperature at the second point in time $t_2$, is below the threshold temperature $T_{th}$, the counter 22 is decreased by one. For a more accurate monitoring of the heat load, the increments and decrements of the timer 21 should be done in proportion to how much the operating temperature is above or below the threshold temperature $T_{th}$. For example, if the operating temperature $T_{op}$ at the first point in time is two degrees Celsius above the threshold temperature $T_{th}$, the counter 22 is increased by two, and if the operating temperature $T_{op}$ at the second point in time is one degree Celsius above the threshold temperature $T_{th}$, the counter is increased again by one, giving it a value of three more than before the first point in time $t_1$. Decreasing the counter 22 may or may not be done with the same proportionality as the increases. In its simplest form, the counter 22 may be decreased by one if the operating temperature at the first point in time $t_1$ is one degree Celsius below the threshold temperature $T_{th}$, and it may be decreased by two if the operating temperature $T_{op}$ is two degrees Celsius below the threshold temperature. However, studies of the reliability of the hard disk drive may have shown that the proportionality should be different because each degree of excess temperature may need to be offset by a different number of degrees or minutes below the threshold temperature $T_{th}$. Just as an example, it may be possible to compensate five minutes of time at an operating temperature $T_{op}$ that is one degree above the threshold temperature $T_{th}$ with five minutes of time at an operating temperature $T_{op}$ that is one degree below the threshold temperature $T_{th}$. Continuing this example, it may not be possible to compensate five minutes of time at an operating temperature $T_{op}$ that is five degrees above the threshold temperature with five minutes of time at an operating temperature $T_{op}$ that is five degrees below the threshold temperature $T_{th}$, or with 25 minutes of time at an operating temperature $T_{op}$ that is one degree below the threshold temperature $T_{th}$. Instead, it may be necessary to compensate higher excess temperatures with longer periods of time below the threshold temperature $T_{th}$. Just as an example, five minutes at an operating temperature five degrees above the threshold temperature $T_{th}$ may need to be compensated with ten minutes of at least five degrees below the threshold temperature $T_{th}$, or one hour at an operating temperature $T_{op}$ that is at least one degree below the threshold temperature $T_{th}$.

The comparison of the high temperature accumulation value $V_{high}$ and the low temperature accumulation value $V_{low}$ is done by comparing the counter value C to a predetermined threshold counter value $C_{th}$. If the counter value C at a given point in time is higher than the predetermined threshold counter value, this indicates that the historical temperature load on the hard disk drive 8 has been too high and that operating temperature lowering action is required. Again, if the counter value C is lower than the threshold counter value $C_{th}$, this indicates that the historical temperature load on the hard disk drive is acceptable. In that case, operating temperature lowering action is not needed.

Figure 2D:
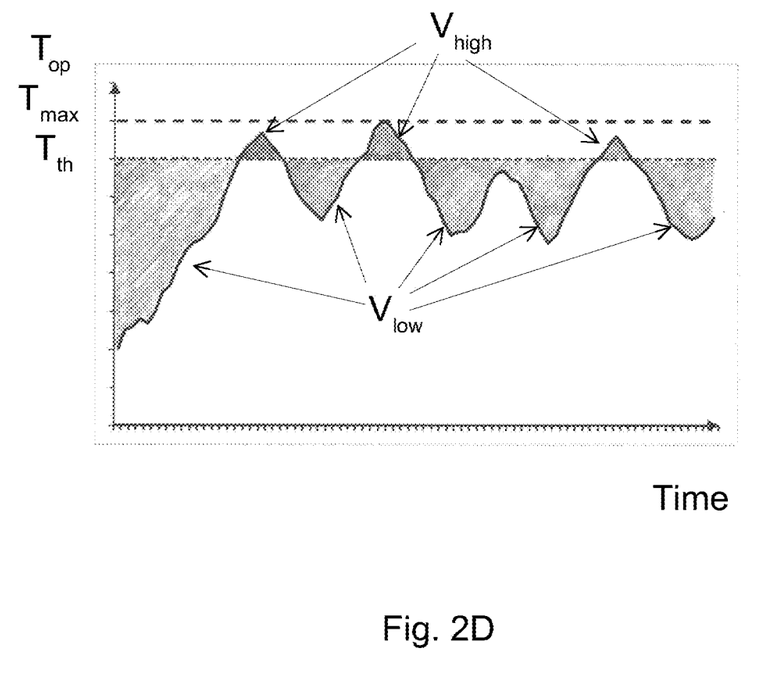
FIG. 2D is a graph showing variations in operating temperature according to a variant of the inventive method.

Regardless of the exact methods used for determining the low and high temperature accumulation values $V_{low}$, $V_{high}$, and the comparison thereof, the temperature control methods described above may be supplemented by an absolute temperature limit in the form of a maximum allowed temperature $T_{max}$, as indicated in FIG. 2D. The maximum allowed temperature $T_{max}$ is a temperature that the hard disk drive is not allowed to exceed, no matter the historical temperature load. Thus, control in relation to the maximum allowed temperature $T_{max}$ will essentially be done in the same way as the prior art temperature control approach described in the background section of the present application. If the operating temperature $T_{op}$ reaches the maximum allowed temperature $T_{max}$, operating temperature lowering action is initiated and continues until the operating temperature has been lowered sufficiently.

Figure 3:
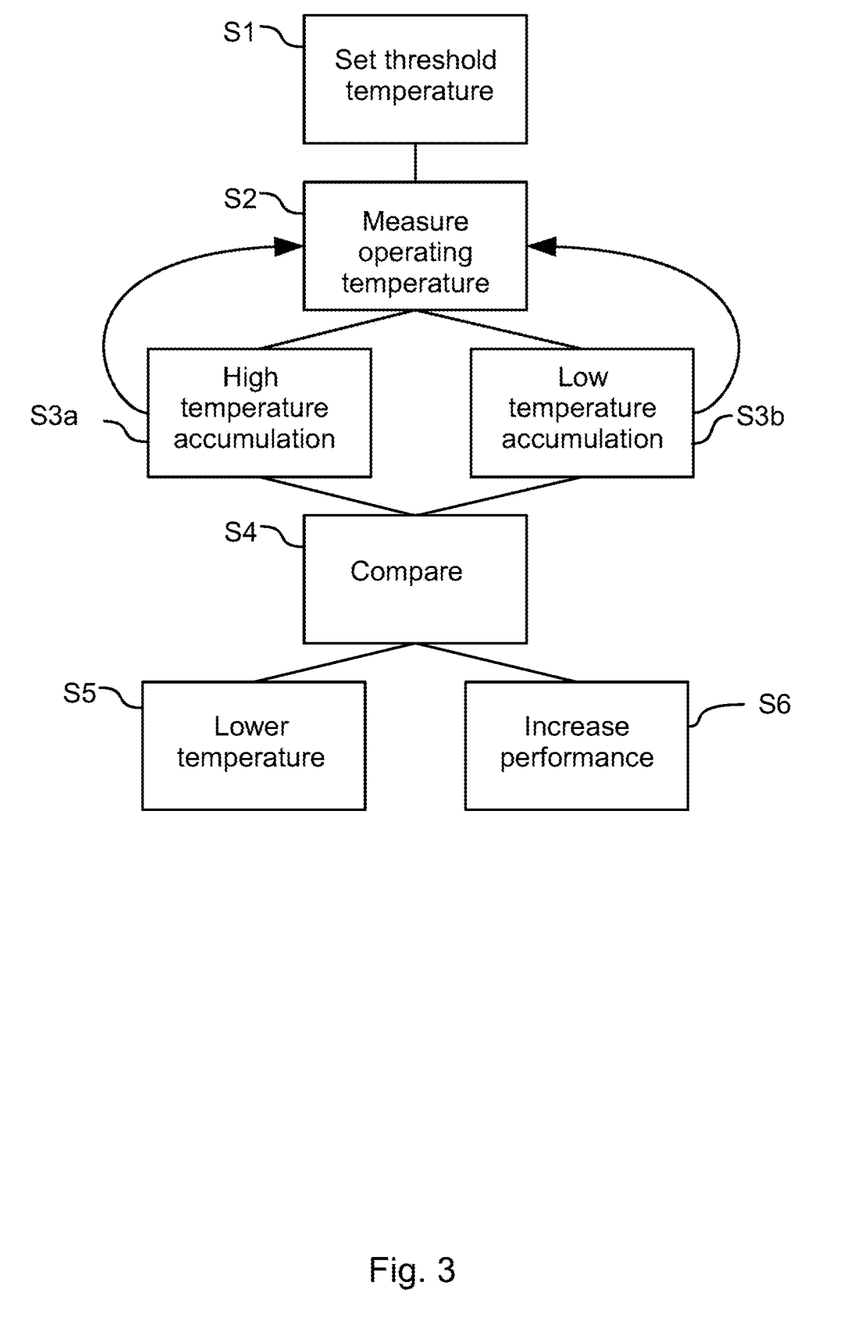
FIG. 3 is a flow chart illustrating the temperature control method according to a variant of the invention.

The new temperature control approach will now be summarised with the help of the flow chart in FIG. 3. In a first step S1, the threshold temperature $T_{th}$ for the hard disk drive 8 is set. This may be pre-programmed by the manufacturer of the hard disk drive 8. During operation of the storage drive, in step S2, the operating temperature $T_{op}$ of the hard disk drive 8 is measured at a plurality of points in time. Thereby, the operating temperature $T_{op}$ is monitored over time, giving a plurality of temperature measurements as a function of time. When the operating temperature $T_{op}$ measured in step S2 is above the threshold temperature $T_{th}$, in step S3a, such threshold temperature measurements are accumulated to form the high temperature accumulation value $V_{high}$. When the measured operating temperature $T_{op}$ is instead below the threshold temperature $T_{th}$, such below threshold temperature measurements are accumulated to form the low temperature accumulation value $V_{low}$ in step S3b. The arrows returning from the accumulation steps S3a and S3b to the measurement step S2 indicate that these steps are repeated over time, updating the accumulation values $V_{low}$, $V_{high}$, in order to create a historical record of the operating temperature $T_{op}$.

In step S4, a comparison is performed where the low temperature accumulation value $V_{low}$ and the high temperature accumulation value $V_{high}$ are compared. If the outcome of the comparison is that the high temperature accumulation value $V_{high}$ is too high in relation to the low temperature accumulation value $V_{low}$, an operating temperature lowering action is initiated in step S5.

In a variant of the method described thus far, an additional step may be added making it possible to increase hard disk drive performance. In an optional step S6, if the outcome of the comparison in step S4 is that the low temperature accumulation value $V_{low}$ is sufficiently large in relation to the high temperature accumulation value $V_{high}$, performance of the hard disk drive is increased, for instance increasing data writing or reading speed. In this way, if the historical heat load on the hard disk drive 8 has been low, the user can be afforded higher hard disk drive performance.

Figure 4:
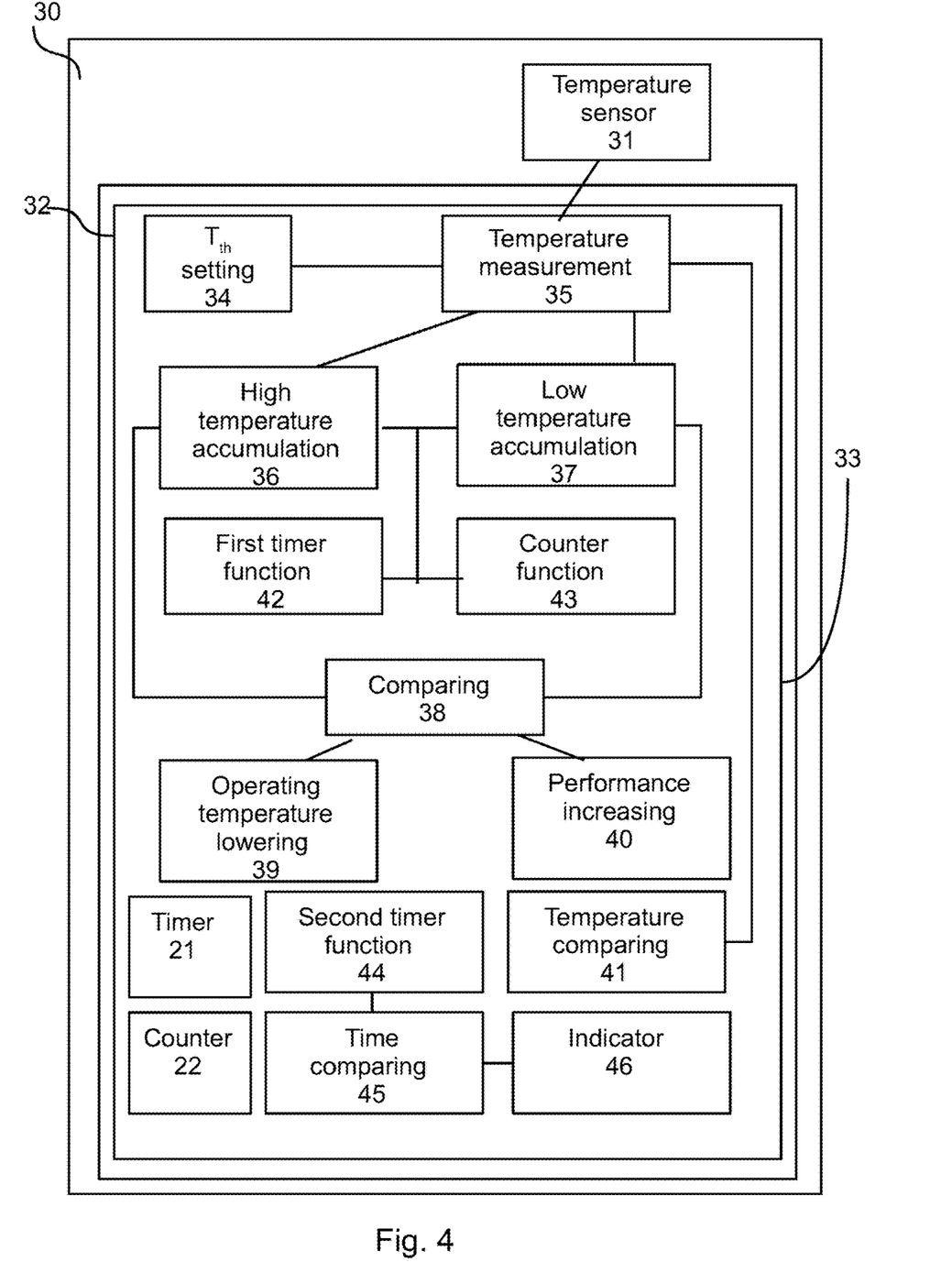
FIG. 4 is a block diagram of an embodiment of the inventive temperature controller.

The timer 21, or an additional timer, may also be used for keeping track of how well the operating temperature lowering actions work. By measuring the time from when the operating temperature passes the threshold temperature $T_{th}$ on the way down to when the operating temperature again passes above the threshold temperature $T_{th}$ it may be detected if the hard disk drive too quickly becomes too hot again after having cooled down. If the time interval during which the hard disk drive 8 operates below the threshold temperature $T_{th}$ is short, i.e., it is shorter than a predetermined minimum time interval, this may mean that the operating temperature lowering action taken has been insufficient. An indication to this effect may therefore be issued, making it possible to adjust the operating temperature lowering action in the future. This may be useful both to a user of the hard disk drive if the temperature control method can be adjusted by user input, and to a manufacturer of hard disk drives or temperature controllers for hard disk drives, as it may be used as input during design. Short intervals between periods of operation above the threshold temperature $T_{th}$ may be detrimental to the hard disk drive 8, as frequent temperature changes may put extra stress on the hard disk drive.

Errors in the operation of the hard disk drive may be continuously or periodically monitored. If errors occur or if errors occur unacceptably frequently, adjustments to the temperature control scheme may be made. Thus, the threshold temperature $T_{th}$ may be adjusted, or more specifically lowered. Alternatively, or additionally, the temperature lowering actions may be adjusted, e.g., increasing cooling performance or further reducing hard disk drive performance.

With reference to FIG. 4, a temperature controller 30 according to an embodiment of the invention will now be described. The temperature controller 30 has a temperature sensor 31. The temperature controller 30 also has circuitry 32 configured to execute a number of functions. The circuitry 32 may include a processor 33, such as a central processing unit (CPU), microcontroller, or microprocessor. The processor 33 is configured to execute program code performing functions of the temperature controller 30. These functions include a threshold temperature setting function 34 for setting the threshold temperature $T_{th}$ for the storage device 8, a temperature measurement function 35 for measuring over time, using the temperature sensor 31, the operating temperature of the storage device at a plurality of points in time during operation of the storage device 8, a high temperature accumulation function 36 for accumulating above threshold temperature measurements over time to form a high temperature accumulation value $V_{high}$, a low temperature accumulation function 37 for accumulating below threshold temperature measurements over time to form a low temperature accumulation value $V_{low}$, a comparing function 38 for comparing the low temperature accumulation value $V_{low}$ and the high temperature accumulation value $V_{high}$, and an operating temperature lowering function 39 for initiating an operating temperature lowering action if an outcome of the comparison is that the high temperature accumulation value $V_{high}$ is too high in relation to the low temperature accumulation value $V_{low}$.

The temperature controller 30 in FIG. 4 operates in accordance with the methods described above.

Optionally, the temperature controller 30 may be equipped with circuitry executing further functions, in line with the variations of the methods already described.

Thus, in some embodiments, the temperature controller 30 comprises circuitry configured to execute a performance increasing function 40. This performance increasing function 40 increases the performance of the storage device 8 if the outcome of the comparison in the comparing function 38 is that the low temperature accumulation value $V_{low}$ is sufficiently high in relation to the high temperature accumulation value $V_{high}$. As noted above, this makes it possible to get better performance from the storage device if it turns out the historical heat load on it has been low.

An optional temperature comparing function 41 of the temperature controller may make it possible to compare the operating temperature $T_{op}$ to the maximum allowed temperature $T_{max}$, thereby ensuring that operating temperature lowering action is initiated if the operating temperature exceeds the maximum allowed temperature $T_{max}$ for preventing damage to the hard disk drive 8.

The temperature controller 30 may also have a first timer function 42 and a counter function 43 for performing the counter incrementation approach to accumulating low and high temperature measurements and comparing low and high temperature accumulation values $V_{low}$, $V_{high}$ as described above in relation to the temperature control method. The first timer function 42 may employ the timer 21 and the counter function may employ the counter 22.

Optionally, the temperature controller 30 may have a second timer function 44, a time comparing function 45, and an indicator function 46 for keeping track of how quickly the operating temperature $T_{op}$ exceeds the threshold temperature $T_{th}$ again after having been reduced. Thus, if the time comparing function 45 determines that the time interval from when the operating temperature was lowered to below the threshold temperature $T_{th}$ to when it once more exceeded the threshold temperature $T_{th}$ is shorter than the predetermined minimum time interval, the indicator function will issue an indication that further operating temperature lowering action may be needed, as discussed above in the context of the method. The second timer function 44 may employ the same timer 21 that the first timer function employs, or it may employ another timer (not shown).

Figure 5:
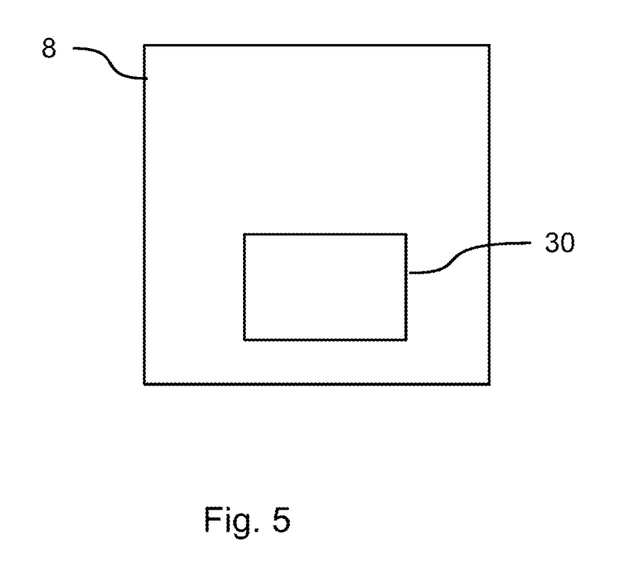
FIG. 5 is a block diagram of an embodiment of a storage device including a temperature controller according to an embodiment of the invention.

FIG. 5 is a block diagram of an embodiment of a storage device 8 including a temperature controller 30 according to an embodiment. By having the temperature controller 30 integrated in the hard disk drive, safe control of the operating temperature of the hard disk drive may be efficiently ensured. If the hard disk drive 8 is included in a recorder 7, the temperature controller may be integrated in the recorder 7 but separate from the hard disk drive 8. This may be particularly advantageous if the recorder 7 has more than one hard disk drive 8. In such case, one temperature controller 30 may control the operating temperature of two or more hard disk drives 8 in the recorder 7. This may make it possible to coordinate operating temperature lowering actions for two or more hard disk drives, such that it can be ensured that one hard disk drive is available for writing when another hard disk drive needs to lower performance for returning to a safe operating temperature $T_{op}$. Pre-emptive cooling of one of the hard disk drives could in such case be initiated before the historical heat load thereon requires it.

Alternatively, the temperature controller may be arranged separately and be operationally connected to one or more hard disk drives 8 whose operating temperature it should control.

The temperature controller 30 may be embodied in hardware, firmware, or software or any combination thereof. When embodied as software, the temperature controller may be provided in the form of computer code or instructions that when executed on a device having processing capabilities will implement the temperature control method described above. Such device may for instance be, or include, a central processing unit (CPU), a graphics processing unit (GPU), a custom-made processing device implemented in an integrated circuit, an ASIC, an FPGA, or logical circuitry including discrete components.

It will be appreciated that a person skilled in the art can modify the above described embodiments in many ways and still use the advantages as shown in the embodiments above. As an example, the temperature control method and temperature controller have mainly been described in relation to hard disk drives, but as noted above, it is equally applicable to other data storage devices, such as SSDs.

Furthermore, although the description above is initially directed to a video surveillance system, this is but an example, to explain a context in which data may need to be stored safely and securely. The temperature control approach is by no means limited to storage of video data but can be applied to any situation in which data needs to be stored in a data storage device.

As described above, the temperature controller and method start keeping track of the heat load below and above the threshold temperature at the time the storage device is taken into operation. In some variations, the temperature control may be applied using a sliding time window, such that the low and high temperature accumulation values are accumulated over the latest hour, day, or month, for instance, rather than the entire life of the storage device. This may be reasonable in situations where the temperature load on the storage device, from ambient temperature and workload, is fairly stable or cyclic. It may also be reasonable to restart the accumulation of the low and high temperature accumulation values if the storage device has been completely shut off for an extended time, or if it has been repaired or restored.

It may be noted that although this disclosure relates to data storage devices, there may also be other electronic devices to which the disclosed temperature control may be applied. The prerequisite for such temperature control is that the device is of a type that can withstand temporary operation above the threshold temperature given sufficient periods of operation below the threshold temperature.

Thus, the concepts should not be limited to the shown embodiments but should only be defined by the appended claims.

The invention claimed is:

1. A method of controlling an operating temperature of a data storage device, the method comprising the steps of:
setting a threshold temperature for the storage device,
over time, during operation of the data storage device, measuring an operating temperature of the storage device at a plurality of points in time, thereby obtaining a plurality of temperature measurements as a function of time, accumulating above threshold temperature measurements over time to form a high temperature accumulation value, accumulating below threshold temperature measurements over time to form a low temperature accumulation value, comparing the low temperature accumulation value and the high temperature accumulation value, and in response to an outcome of the comparison is that the high temperature accumulation value is too high in relation to the low temperature accumulation value, initiating an operating temperature lowering action.

2. The method according to claim 1, wherein the operating temperature lowering action is at least one from the group of starting a cooling arrangement, increasing performance of the cooling arrangement, or reducing performance of the data storage device.

3. The method according to claim 1, further comprising:
if the outcome of the comparison is that the low temperature accumulation value is sufficiently large in relation to the high temperature accumulation value, increasing performance of the data storage device.

4. The method according to claim 1, wherein:
the high temperature accumulation value is formed by calculating a first integral of temperature measurements above the threshold temperature as a function of time,
the low temperature accumulation value, is formed by calculating a second integral of temperature measurements below the threshold temperature as a function of time, and wherein
comparing the low temperature accumulation value and the high temperature accumulation value is done by calculating a ratio between the low temperature accumulation value and the high temperature accumulation value.

5. The method according to claim 1, wherein the steps of accumulating and comparing comprise:
starting a timer,
if, at a first point in time, the measured temperature is above the threshold temperature, incrementing a counter in proportion to a number of degrees that the measured temperature is above the threshold temperature,
if, at the first point in time, the measured temperature is below the threshold temperature, decrementing the counter in proportion to a number of degrees that the measured temperature is below the threshold temperature, and
the outcome of the comparison is that the high temperature accumulation value is too high in relation to the low temperature accumulation value if the counter exceeds a predetermined threshold counter value.

6. The method according to claim 1, further comprising comparing the measured operating temperature to a maximum allowed temperature, the maximum allowed temperature being higher than the threshold temperature, and if the measured operating temperature is above the maximum allowed temperature, initiating an operating temperature lowering action.

7. The method according to claim 1, further comprising:
measuring a first time interval from a first point in time when the measured operating temperature passed from above the threshold temperature to below the threshold temperature to a second point in time when the measured operating temperature next passed from below the threshold temperature to above the threshold temperature, comparing the first time interval with a predetermined minimum time interval, and if the first time interval is shorter than the predetermined minimum time interval, issuing an indication that further operating temperature lowering actions may be needed.

8. The method according to claim 1, further comprising:
monitoring errors in operation of the storage device, and
based on an occurrence of errors, adjusting at least one of the threshold temperature or the operating temperature lowering actions.

9. A temperature controller for controlling an operating temperature of a data storage device, the temperature controller comprising:
a temperature sensor,
the temperature controller further comprising circuitry configured to execute:
setting a threshold temperature for the storage device,
measuring over time, using the temperature sensor, an operating temperature of the storage device at a plurality of points in time during operation of the storage device, thereby obtaining a plurality of temperature measurements as a function of time,
accumulating above threshold temperature measurements over time to form a high temperature accumulation value,
accumulating below threshold temperature measurements over time to form a low temperature accumulation value,
comparing the low temperature accumulation value and the high temperature accumulation value, and
initiating an operating temperature lowering action in response to an outcome of the comparison is that the high temperature accumulation value is too high in relation to the low temperature accumulation value.

10. The temperature controller according to claim 9, further comprising circuitry configured to execute:
increasing performance of the storage device if an outcome of the comparison is that the low temperature accumulation value is sufficiently high in relation to the high temperature accumulation value.

11. The temperature controller according to claim 9, wherein:
forming the high temperature accumulation value comprises calculating a first integral of temperature measurements above the threshold temperature as a function of time,
forming the low temperature accumulation value comprises calculating a second integral of temperature measurements below the threshold temperature as a function of time, and
compare the low temperature accumulation value and the high temperature accumulation value by calculating a ratio between the low temperature accumulation value and the high temperature accumulation value.

12. The temperature controller according to claim 9, further comprising circuitry configured to execute:
a first timer, and
a counter, and wherein,
the high temperature accumulation increments the counter in proportion to a number of degrees that the measured temperature is above the threshold temperature if, at a first point in time, the measured temperature is above the threshold temperature,
the low temperature accumulation decrements the counter in proportion to a number of degrees that the measured temperature is below the threshold temperature if, at the first point in time, the measured temperature is below the threshold temperature, and the comparing determines that the high temperature accumulation value is too high in relation to the low temperature accumulation value if the counter exceeds a predetermined threshold counter value.

13. The temperature controller according to claim 9, further comprising circuitry configured to execute:

a second timer for measuring a first time interval from a first point in time when the measured temperature passed from above the threshold temperature to below the threshold temperature to a second point in time when the measured temperature next passed from below the threshold temperature to above the threshold temperature, comparing the first time interval with a predetermined minimum time interval, and issuing an indication that further operating temperature lowering actions may be needed if the first time interval is shorter than the predetermined minimum time interval.

14. A data storage device comprising a temperature controller for controlling an operating temperature of a data storage device, the temperature controller comprising:

a temperature sensor, the temperature controller further comprising circuitry configured to execute:

setting a threshold temperature for the storage device, measuring over time, using the temperature sensor, an operating temperature of the storage device at a plurality of points in time during operation of the storage device, thereby obtaining a plurality of temperature measurements as a function of time, accumulating above threshold temperature measurements over time to form a high temperature accumulation value, accumulating below threshold temperature measurements over time to form a low temperature accumulation value, comparing the low temperature accumulation value and the high temperature accumulation value, and initiating an operating temperature lowering action in response to an outcome of the comparison is that the high temperature accumulation value is too high in relation to the low temperature accumulation value.

15. A non-transitory computer readable storage medium having stored thereon instructions for implementing a method, when executed on a device having processing capabilities, for controlling an operating temperature of a data storage device, the method comprising the steps of:

setting a threshold temperature for the storage device, over time, during operation of the data storage device, measuring an operating temperature of the storage device at a plurality of points in time, thereby obtaining a plurality of temperature measurements as a function of time, accumulating above threshold temperature measurements over time to form a high temperature accumulation value, accumulating below threshold temperature measurements over time to form a low temperature accumulation value, comparing the low temperature accumulation value and the high temperature accumulation value, and in response to an outcome of the comparison that the high temperature accumulation value is too high in relation to the low temperature accumulation value, initiating an operating temperature lowering action.

* * * * *